J. J. HASKIN.
COMBINATION LOCK.
APPLICATION FILED MAR. 26, 1921.
1,407,273.
Patented Feb. 21, 1922.
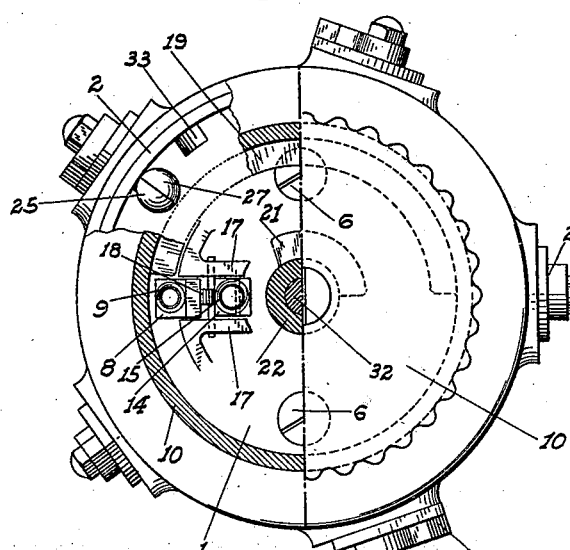
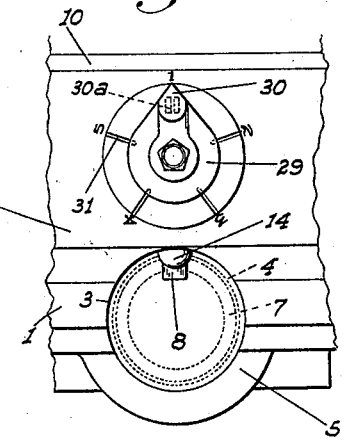
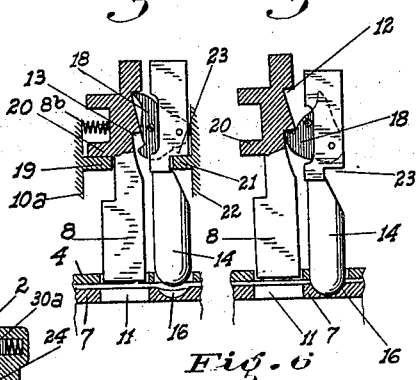
INVENTOR.
Joseph J. Haskin
BY
ATTORNEY

UNITED STATES PATENT OFFICE.

JOSEPH J. HASKIN, OF STOCKTON, CALIFORNIA, ASSIGNOR OF ONE-HALF TO THOMAS H. ROSCOE, OF ALAMEDA, CALIFORNIA.

COMBINATION LOCK.

1,407,273.  Specification of Letters Patent.  Patented Feb. 21, 1922.

Application filed March 26, 1921. Serial No. 455,840.

*To all whom it may concern:*

Be it known that I, JOSEPH J. HASKIN, a citizen of the United States, residing at Stockton, county of San Joaquin, State of California, have invented certain new and useful Improvements in Combination Locks; and I do declare the following to be a full, clear, and exact description of the same, reference being had to the accompanying drawings, and to the characters of reference marked thereon, which form a part of this application.

This invention relates to improvements in combination locks, and particularly to a type adapted to be mounted on the steering column of a motor vehicle to lock the steering post against movement when desired, thus preventing the theft of the vehicle.

The principal object of my invention is to provide a locking device for the purpose specified, with a simple yet efficient combination installed in connection therewith, which, when the locking lug is engaged with the post, must be correctly worked in order to be able to release the lock.

Another object is to so arrange the locking members that while a positive lock is assured, at the same time the post may be manipulated to a certain extent before the lock will take effect, thus avoiding conflict with the laws of certain states, which specify that a vehicle must not be left rigidly locked.

The device may also be adapted for use with safes, to lock the sliding bolts against movement, the locking member working equally well with a turnable post or a sliding bolt.

These objects I accomplish by means of such structure and relative arrangement of parts as will fully appear by a perusal of the following specification and claims.

In the drawings similar characters of reference indicate corresponding parts in the several views.

Fig. 1 is a top plan view of the lock, with the cap partly cut away to show certain parts, and of a type adapted for use with a steering post.

Fig. 2 is a sectional elevation of the lock showing the locking lug in locking position.

Fig. 3 is a fragmentary side elevation of the lock-casing, showing one of the combination handles.

Fig. 4 is a detached view of the locking lugs, showing the same raised to allow the steering post to turn freely.

Fig. 5 is a similar view showing the initial locking position.

Fig. 6 is another similar view showing the main locking lug in position to engage the post-slot, which will be as shown in Fig. 2.

Fig. 7 is a fragmentary view showing the application of the combination mechanism to the lock when used on a safe.

Referring now more particularly to the characters of reference on the drawings, the numeral 1 denotes a body member preferably cylindrical, and provided with an upstanding flange or rim 2 on its outer periphery. A semicircular groove 3 extends diametrically of the body in the face thereof opposite to the groove 2, and is adapted to receive the rigid steering column 4 therethrough, said body being clamped to the column by means of a suitable cap 5 secured to the body by means of screws 6 set in from the interior of the body. A turnable steering post 7 is mounted in the column or sleeve 4 as is customary.

Mounted in the body 1 for slidable movement in a plane at right angles to the post 7 is the main locking bolt 8 which is pressed toward said post by a spring 9 bearing thereagainst and against a cover or cap 10 turnably mounted on the body, the means controlling the lock being mounted on the cap, and the combination controlling the movement of the cap being mounted in the body to co-operate with the cap, as will be seen hereinafter.

The bolt 8 is adapted to aline with and fit into a slot 11 in the post 7 (being of course cut through the column 4 also) and is provided on the face farthest from the flange 2 with upper and lower ratchet shaped notches 12 and 13 respectively.

Mounted in the body 1 in parallel alinement with the bolt 8 and adjacent the notched face thereof is a pin 14, pressed toward the post 7 by a spring 15 bearing against the cap, the lower end of the pin being rounded and adapted to seat in a rounded socket 16 in the post 7.

Pivoted to and between rigid uprights 17 positioned at the sides of the members 8 and 14 and fixed to the body is a dog 18 having upper and lower catch members, which dog is also pivoted to the pin 14 in a plane off-set from its connection with the uprights 17.

An inwardly projecting flange 19, forming a cam-track, is provided on the inner periphery of the cap, and is adapted to engage and ride under a shoulder 20 provided on the lug 8. A similar but necessarily shorter track-flange 21 is formed on the central hub 22 of the cap and is adapted to ride under and engage a shoulder 23 on the pin 14, these tracks slanting from end to end a distance sufficient to move the bolt and pin clear of the post 7, and the track for the latter being positioned relative to the track for the former, to take hold of and move the pin only after the bolt has been moved a predetermined distance.

The operation of the lock is as follows:

Presume that the lock is engaged as shown in Fig. 2. When the cap is turned in a clockwise direction (according to the showing of the drawing in the present instance) the track 19 first engages the bolt 8 and raises the same clear of the post 7, without interference with the dog 18, the slot 8ª in the body for said bolt allowing sufficient play of the lug to allow it to pass by the dog. When the bolt 8 is raised to a certain extent, the track 21 engages the pin 14, likewise raising the same clear of the post socket. At the same time the upper catch of the dog, the latter moving about its fixed pivotal connection with the member 17, engages the upper notch 12 of the bolt 8.

As long as the cap is maintained in a position to hold the bolt and pin as described and as shown in Fig. 4 the post 7 may be freely turned. When the cap is turned in the opposite direction, thus lowering the tracks from under the bolt and pin, no movement of the latter members will occur as long as their inner ends are not in alinement with the post socket and slot. The post is therefore free to be turned until such alinement takes place.

Since the dog is engaging the bolt, the latter cannot drop into the slot first, but the pin is free to do so, as shown in Fig. 5.

The position of the catches of the dog is thus almost instantaneously reversed that the lower catch thereon engages the lower notch 13 on the bolt 8, thus again preventing the latter from seating in its post slot. This reversal of position of the dog is had by reason of the fact that while the pivotal connection of the dog with the member 17 remains at a fixed point, the other similar connection of the dog with the pin 14 moves downwardly, throwing the opposite edge of the dog upwardly, throwing the lower catch toward the locking bolt, and the upper catch away therefrom. The post 7 may then still be turned, but any turning movement will of course force the pin out of the post socket (the latter being smooth and rounded as stated.)

The members then assume the position as shown in Fig. 6, the dog being disengaged from both bolt-notches. Then when the post is again turned (as it must be sooner or later) to aline the slot and socket with the bolt and pin, both these members independently and freely drop into their respective planes, securely locking the post against further movement until they are withdrawn by a movement of the cap. A light spring 8ᵇ acts on the bolt 8 to normally force the same toward the dog.

Further movement of the cap to release the locking bolt is prevented from being done by any other than the rightful owner or driver by means of the following described combination:—Pins 24 are readily positioned and journaled in the flange 2, the center lines thereof being in alinement with the floor of the body. On the inner ends of the pins are semispherical members 25, seated in sockets 26 in the body, the corresponding halves 27 of said spheres being adapted to seat in sockets 28 in the flange 10ª of the cap which fits inside the flange 2, these positions being had when the combination is thrown to allow the cap to turn. Fixed to the pins on the outside of the body are odd-shaped heads 29, each one being set at a different position with regard to the spherical member on the corresponding pin. Each head is provided with a pointer 30, which has a spring-pressed pin 30ª therein adapted to register with any one of a number of radial slits 31, on the body, so that the combination may be worked in the dark if necessary.

It will be evident therefore that unless the split line between the co-operating spherical member is in alinement with the flush surface of the body and cap, the latter cannot be rotated, since as soon as any one of the pins is turned past this point, one edge of the spherical member fixed thereon will project into the socket in the cap, while the independent spherical member will project into the body socket a corresponding amount. All the spherical members must have their split lines flush with the body, and as they cannot be seen, their positions are determined by the alinement of the head pointers with the radial slits on the body. Since the heads may be mounted on the pins so as to have each pointer register with a different slit, to give the same alinement of all the spherical members, a simple yet effective combination is formed.

The cap may be centered and held on the body by means of a screw 32, but it is also held on in a more positive manner by means of opposed pins 33 fixed to and projecting inwardly of the flange 2, which pins ride in a groove 34 in the flange 10ª of the cap, said groove having opposed vertical grooves 35 communicating with the inner edge of the flange 10ª to enable the cap to be removed when the pins aline with said grooves 35, the latter being so positioned that this is impossible when the locking lug 8 is in its locking position, and when the combination sockets are in alinement.

It will thus be seen that it will be impossible to disrupt or remove the device unless the parts are actually wrecked, since the cap cannot be removed when the lock is engaged, and the cap 5 is also prevented from being removed as the heads of the screws or bolts 6 are inside the body.

A spring catch member C is mounted on the cap 10 and is adapted to engage with the edge of the flange 2 at predetermined points in the relative positioning of the cap and body, so that the operator may know when the lug and pin are raised, when they are released, and at what point the cap may be removed from the body.

For safe-door purposes, the cap 36 is turnably mounted in the door 37 and is provided with a handle 38. The pins 24ª having the combination members attached thereto, are not positioned radially of the cap, but axially and around the periphery thereof, while maintaining the same relative positioning of the spherical members 25ª between said cap and the body 1ª set in the door. The locking mechanism operates in the same manner as that first described, since the turnable steering post is merely replaced by a sliding bolt. A hood 39 is preferably positioned on the door to conceal the combination members from sight while allowing of the insertion of a hand to manipulate the same.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A lock comprising a fixed body mounted in connection with a movable post, a spring-pressed locking bolt slidably mounted in the body and adapted to seat in a slot provided in the post, a cap turnably mounted on the body and arranged in connection with the bolt to withdraw the same from the slot with the turning of said cap and a combination mechanism between the body and cap arranged to prevent undesired mechanism of the latter, such mechanism comprising pins turnably mounted in the body, each pin being adapted to be independently manipulated from the exterior of the body, semispherical members formed with the pins on the inner ends thereof, and independent semispherical members complementary to the first named members, the body and cap being abutting along the plane of the axes of said pins and members and being provided with sockets to receive the latter.

2. A combination lock comprising a body, a cap turnably mounted therewith, pins turnably mounted in the body, each pin being adapted to be independently manipulated from the exterior of the body, semispherical members formed with the pins on the inner ends thereof, and independent semispherical members complementary to the first named members, the body and cap being abutting along the plane of the axes of said pins and members and being provided with sockets to receive the latter.

3. A lock comprising a fixed body mounted in connection with a movable post, a spring-pressed locking bolt slidably mounted in the body and adapted to seat in a slot provided in the post, a spring pressed pin slidably mounted in the body adjacent and parallel to the bolt and adapted to seat in a socket provided in the post, a cap turnably mounted on the body, slanting tracks carried by the cap and arranged to engage and raise the bolt and pin and means co-operating between the said bolt and pin whereby when the cap is rotated to withdraw the tracks from the bolt and pin the latter may drop into its socket but the bolt cannot drop into its slot until the pin is raised out of the socket with the movement of the post.

4. A lock comprising a fixed body mounted in connection with a movable post, a spring-pressed locking bolt slidably mounted in the body and adapted to seat in a slot provided in the post, a cap turnably mounted on the body, a spring pressed pin slidably mounted in the body adjacent and parallel to the bolt and adapted to seat in a socket provided in the post, slanting tracks carried by the cap and arranged to engage and raise the bolt and pin and a common means actuated by the movement of the pin for holding the bolt from entering the post slot when the cap is rotated to withdraw the tracks from engagement with the bolt and pin while permitting the latter to enter its socket, and for then permitting said bolt to enter its slot when the pin is withdrawn from the socket with a movement of the post.

5. A lock comprising a fixed body mounted in connection with a movable post, a spring-pressed locking bolt slidably mounted in the body and adapted to seat in a slot provided in the post, a cap turnably mounted on the body, a spring pressed pin slidably mounted in the body adjacent and parallel to the bolt and adapted to seat in a socket provided in the post, slanting tracks carried by the cap and arranged to engage and raise the bolt and pin, the bolt being provided with a pair of notches on the face thereof adjacent the pin, a dog carried by the latter and pivoted thereto and to the body in an offset plane from the pivotal connection with the pin, said dog being provided with a pair of catches; the upper one being adapted to engage the upper bolt-notch when the bolt and pin are raised; the lower catch being adapted to engage the lower bolt-notch when the tracks are withdrawn from the pin and bolt and the pin has dropped in its socket; and both catches being free of both notches when the pin is again raised from its socket with a movement of the post.

In testimony whereof I affix my signature.

JOSEPH J. HASKIN.